US006958480B1

(12) United States Patent
Iyer et al.

(10) Patent No.: US 6,958,480 B1
(45) Date of Patent: Oct. 25, 2005

(54) SAMPLE DESORPTION/IONIZATION FROM MESOPOROUS SILICA

(75) Inventors: Srinivas Iyer, Los Alamos, NM (US); Andrew M. Dattelbaum, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 25 days.

(21) Appl. No.: 10/877,690

(22) Filed: Jun. 25, 2004

(51) Int. Cl.$^7$ ........................... C12Q 1/68; B32B 3/00; B32B 7/00; B01D 15/08
(52) U.S. Cl. ................ 250/340; 250/341.1; 250/341.2; 250/341.3; 250/341.4; 250/341.5; 250/341.6; 250/341.7; 250/341.8; 250/312.6; 428/312.2; 428/304.4; 428/313.9; 428/317.9; 428/119; 428/195.1; 428/469; 428/689; 428/411.1; 428/425.6; 428/426; 428/433; 428/457; 428/446; 428/292.1; 428/293.7; 428/294.4; 428/294.7
(58) Field of Search .................. 250/340, 341.1–341.8, 250/312.6, 304.4, 312.2, 313.9, 317.9, 292.1–294, 250/119, 469, 195.1, 689, 411.1, 426, 425.6, 250/433, 446, 457

(56) References Cited

U.S. PATENT DOCUMENTS

| 5,834,195 A | 11/1998 | Benkovic |
| 5,869,832 A | 2/1999 | Wang |
| 6,288,390 B1 | 9/2001 | Siuzdak |
| 6,355,420 B1 * | 3/2002 | Chan ............................. 435/6 |
| 6,399,177 B1 * | 6/2002 | Fonash et al. .............. 428/119 |
| 6,447,991 B1 | 9/2002 | Daitch |
| 6,707,036 B2 | 3/2004 | Makarov |
| 6,707,040 B2 | 3/2004 | Makarov |
| 2002/0046966 A1 * | 4/2002 | Muscate-Magnussen . 210/198.2 |
| 2002/0048531 A1 | 4/2002 | Fonash |
| 2002/0119455 A1 * | 8/2002 | Chan ............................. 435/6 |
| 2002/0132101 A1 * | 9/2002 | Fonash et al. ........... 428/304.4 |
| 2002/0187312 A1 * | 12/2002 | Fonash et al. .............. 428/195 |
| 2003/0057106 A1 | 3/2003 | Shen |
| 2004/0248108 A1 * | 12/2004 | Lakshmi et al. ................ 435/6 |

FOREIGN PATENT DOCUMENTS

WO     WO 00/54309     9/2000

OTHER PUBLICATIONS

Anderson, Joseph: About Physics—Surfactant; <ttp://physics.about.com/cs/chemphysexp/q/surfactant.htm>.*
Alargova et al., "Scalable Synthesis of a New Class of Polymer Microrods by a Liquid-Liquid Dispersion Technique", Adv. Mater. 16 (18), 2004, pp. 1653-1657.*
"Low Dielectric Constant Materials and Applications in Microelectronics", Proc. MRS Symposium O, Apr. 5-8, 1999, <http://www.mrs.org/meetings/spring99/abstarctbook/AbstractBookO.html.*

(Continued)

*Primary Examiner*—John R. Lee
*Assistant Examiner*—Bernard E. Souw
(74) *Attorney, Agent, or Firm*—Samuel L. Borkowsky

(57) ABSTRACT

Mesoporous silica is shown to be a sample holder for laser desorption/ionization of mass spectrometry. Supported mesoporous silica was prepared by coating an ethanolic silicate solution having a removable surfactant onto a substrate to produce a self-assembled, ordered, nanocomposite silica thin film. The surfactant was chosen to provide a desired pore size between about 1 nanometer diameter and 50 nanometers diameter. Removal of the surfactant resulted in a mesoporous silica thin film on the substrate. Samples having a molecular weight below 1000, such as $C_{60}$ and tryptophan, were adsorbed onto and into the mesoporous silica thin film sample holder and analyzed using laser desorption/ionization mass spectrometry.

25 Claims, 5 Drawing Sheets

OTHER PUBLICATIONS

Warren G. Lewis et al., "Desorption/Ionization on Silicon (DIOS) Mass Spectrometry: Background and Applications," International Journal of Mass Spectrometry, vol. 226, pp. 107-116, 2003.

Jing Wei et al., "Desorption-Ionization Mass Spectrometry on Porous Silicon," Nature, vol. 399, pp. 243-246, 1999.

H. D. Beckey et al., "Some New Field Desorption Techniques," International Journal Mass Spectrometry and Ion Physics, vol. 3, pp. 9-11, 1970.

Shankai Zhao et al., "Novel Method For Matrix-Assisted Laser Spectrometry of Proteins," Anal. Chem, vol. 63, pp. 450-453, 1991.

"Laser Desorption Ionization of Proteins with Molecular Masses Exceeding 10 000 Daltons," Anal. Chem., vol. 60, pp. 2299-2301, 1988.

R. D. Macfarlane et al., "Californium-252 Plasma Desorption Mass Spectroscopy," Science, vol. 191, pp. 920-925, 1976.

S. L. Wang et al., "Studies of Silicon-Nitride (Si3N4) Using Laser Ablation Mass Spectrometry," Applied Surface Science, vol. 93, pp. 205-211, 1996.

D. M. Hrubowchak et al., "Detection of Biomolecules on Surfaces Using Ion-Beam-Induced Desorption and Multiphoton Resonance Ionization," Anal. Chem., vol. 63, pp. 1947-1953, 1991.

Qiao Zhan et al., "Laser Desorption Substrate Effects," J. Am. Soc. Mass. Spectrom., vol. 8, pp. 525-531, 1997.

Joseph D. Cuiffi et al., "Desorption-Ionization Mass Spectrometry Using Deposited Nanostructured Silicon Films," Anal. Chem., vol. 73, pp. 1292-1295, 2001.

M. A. Posthumus et al., "Laser Desorption-Mass Spectrometry of Polar Nonvolatile Bio-Organic Molecules," Anal. Chem., vol. 50, No. 7, pp. 985-991, 1978.

* cited by examiner

US 6,958,480 B1

SAMPLE DESORPTION/IONIZATION FROM MESOPOROUS SILICA

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to mass spectrometry and more particularly to the use of mesoporous silica as a sample holder for desorption/ionization mass spectrometry.

BACKGROUND OF THE INVENTION

Mass spectrometry (MS) is used to measure the mass of a sample molecule, as well as the masses of fragments of the molecule, in order to identify that sample. Some mass spectrometers begin with a gaseous, electrically neutral sample that is ionized using an electron beam. The resulting ions are accelerated by an electric field to a magnetic sector where they are deflected to a detector. The mass to charge ratio (m/z ratio) of these ions can be calculated as a function of the path through, and the strength of, the magnetic field used to deflect the sample ions to the detector. The mass is typically expressed in terms of atomic mass units, also referred to as Daltons. The electric charge of the sample ions is typically expressed in terms of multiples of elementary charge. Sample ions can be singly or multiply charged, and for sample ions having only a single charge, the m/z ratio is the mass of the ion.

Another method for measuring the mass of sample ions is time-of-flight (TOF) mass spectrometry, which involves measuring how long it takes the sample ions, or fragments of them, to travel a known distance. Post Source Decay (PSD) studies of the charged fragments can be used to better understand the structure of the sample. After fragmentation, the resulting pieces all travel at the same speed and arrive at the detector at the same time, where they are repelled by an electric field. The reflected ions have different speeds that depend on their individual masses, which can be measured to better understand the molecular structure of the corresponding sample.

Molecules that are not easily rendered gaseous can be difficult to study using MS. Accordingly, advances in MS often address problems associated with handling liquid or solid samples.

Desorption MS is a mass spectrometric technique useful with solid and liquid samples. Sample molecules are first adsorbed on a substrate. Later, they are desorbed (i.e. removed) from the substrate. Desorption MS became even more useful, particularly for the study of biomolecules such as proteins, by a technique that has come to be known as "matrix-assisted laser desorption/ionization" (MALDI). In contrast to MS techniques that use an electron beam to ionize a sample, MALDI uses an organic matrix to transfer a proton to the sample during sample vaporization. In MALDI, the sample is typically dissolved in a solid, ultraviolet-absorbing, crystalline organic acid matrix. The matrix vaporizes upon pulsed laser irradiation; the sample is carried along with the vaporized matrix to the detector.

In MALDI, salts and buffers can interfere with the formation of the matrix crystal and result in loss of signal. MALDI is also severely limited in the study of small molecules because the MALDI matrix interferes with measurements of ions having an m/z ratio below about 700. This mass region is sometimes called the low-mass region and varies somewhat depending on the matrix used. Although MALDI-MS (matrix-assisted laser desorption/ionization mass spectrometry) analysis can be utilized for small molecules, and matrix suppression can be achieved under certain circumstances, matrix interference presents a real limitation of the study of the low-mass region via MALDI-MS.

Even with large molecules, MALDI has significant limitations. The matrix and matrix fragments can form adducts with the sample ion. Adduct formation results in a broadening of the sample signal over a range of molecular weights.

MALDI is also limited in studying the Post Source Decay (PSD) of molecules because the vaporized matrix molecules of the sample interfere with the measurement of the fragments after reflection, rendering MALDI impractical even for molecules with a molecular weight over 700 Daltons.

Direct desorption/ionization without a matrix has been studied on a variety of substrates. Some of the more recently developed substrates are described in the following publications and patents: "Desorption-Ionization Mass Spectrometry on Porous Silicon" by Jing Wei, Jillian M. Buriak and Gary Siuzdak, Nature, vol. 399, pp. 243–246 (1999); PCT Application Publication Number WO/00/54309 to Gary E. Siuzdak, Jillian Buriak, and Jing Wei entitled "Improved Desorption/Ionization of Analytes from Porous Light-Absorbing Semiconductor," which was published on Sep. 14, 2000; U.S. Pat. No. 6,288,390 to Gary E. Siuzdak et al. entitled "Desorption/Ionization of Analytes from Porous Light- Absorbing Semiconductor," issued on Sep. 11, 2001; "Desorption-Ionization Mass Spectrometry Using Deposited Nanostructured Silicon Films," by Joseph D. Cuiffi, Daniel J. Hayes, Stephen J. Fonash, Kwanza N. Brown, and Arthur D. Jones, Anal. Chem, vol. 73 (2001) pp. 1292–1295; U.S. Patent Application Publication 2002/0048531, published on Apr. 25, 2002; U.S. Pat. No. 6,399,177 to Steven J. Fonash, Ali Kaan Kalkan, and Sanghoon Bae entitled "Deposited Thin Film Void-Column Network Materials, which issued Jun. 4, 2002; U.S. Patent Application Publication 2002/0187312 entitled "Matrix-Free Desorption Ionization Mass Spectrometry Using Tailored Morphology Layer Devices" by Steven J. Fonash, Ali Kaan Kalkan, Joseph Cuiffi, and Daniel J. Hayes, which was published on Dec. 12, 2002; "Desorption/Ionization on Silicon (DIOS) Mass Spectrometry: Background and Applications" by Warren G. Lewis, Zhouxin Shen, M. G. Finn, and Gary Siuzdak, Int. J. Mass. Spectrometry, vol. 226, (2003), pp. 107–116; U.S. Patent Application Publication 2003/0057106 entitled "High Throughput Chemical Analysis By Improved Desorption/ Ionization on Silicon Mass Spectrometry" by Zhouxin Shen and Gary Siuzdak, which was published on Mar. 27, 2003; U.S. Pat. No. 6,707,036 and U.S. Pat. No. 6,707,040, both to Alexander A. Makarov and Pavel V. Bondarenko, both entitled "Ionization Apparatus and Method for Mass Spectrometer System," both of which issued on Mar. 16, 2004, all hereby incorporated by reference. Perhaps the best substrate to date, which is described in at least some of the aforementioned patents and publications, is porous silicon (the acronym DIOS refers to "Desorption/Ionization on Silicon"). The '390 patent, for example, describes the use of porous, light absorbing semiconducting substrates for the desorption/ionization of analyte. These substrates were used as replacements for the organic matrix in MALDI for analyzing proteins and other biomolecules by laser desorption/ionization mass spectrometry. Illumination of the semiconductor results in desorption/ionization of analyte, and the ionized analyte can then be detected. An advantage of using the porous silicon substrate relates to the ability to perform measurements without an organic matrix, making DIOS more amenable to small molecule analysis. The absence of a matrix completely avoids the types of interference that result when a matrix is used. Also, DIOS can be used for the Post Source Decay (PSD) measurements on fragments; these measurements are usually difficult or impossible to perform with MALDI.

Porous silicon substrates have become commercially available (WATERS CORPORATION, www.waters.com, and MASS CONSORTIUM, http://www.masscons.com for example).

There are, however, disadvantages to using porous silicon substrates. Porous silicon substrates require special storage and handling conditions. Moreover, even if stored as described by the manufacturer, they become unusable after about a month.

There remains a need for more robust substrates for matrix-free desorption/ionization mass spectrometry.

An object of the present invention is to provide robust porous substrates for matrix-free desorption/ionization mass spectrometry.

Another object of the present invention is to provide porous substrates for desorption/ionization mass spectrometry having a controllable porosity in the mesoporous range of from about 1 nanometer diameter to about 50 nanometers diameter sized pores.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for performing laser desorption mass spectrometry. The method includes forming an ordered nanocomposite thin film on a substrate, the thin film including a surfactant; removing the surfactant to transform the film into a mesoporous silica thin film; adsorbing a sample on the mesoporous silica thin film; exposing the mesoporous silica thin film with adsorbed sample to a laser light beam in an ion-generating section of a mass spectrometer to desorb and ionize the sample; and detecting the desorbed and ionized sample.

The invention also includes a method for performing laser desorption mass spectrometry that includes preparing a self-assembled, ordered, nanocomposite, silica thin film on a substrate, the self-assembled, ordered, nanocomposite silica thin film including a surfactant chosen to produce an ordered mesoporous silica thin film having a desired pore size; removing the surfactant to form the ordered nanocomposite silica thin film to yield a mesoporous silica thin film; adsorbing a sample on the mesoporous silica thin film; exposing the mesoporous silica thin film to a laser light beam in an ion generating section of a mass spectrometer to desorb and ionize the sample; and detecting the desorbed and ionized sample.

The invention also includes a method for performing laser desorption mass spectrometry that includes adsorbing a sample on mesoporous silica comprising a pore size of from about 1 nanometer to about 50 nanometers; exposing the mesoporous silica to a laser light beam in an ion-generating section of a mass spectrometer to desorb and ionize the sample; and detecting the desorbed and ionized sample.

The invention also includes a sample holder for a laser desorption mass spectrometer that consists essentially of a thin film of mesoporous silica on a solid support.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

Figure 1:
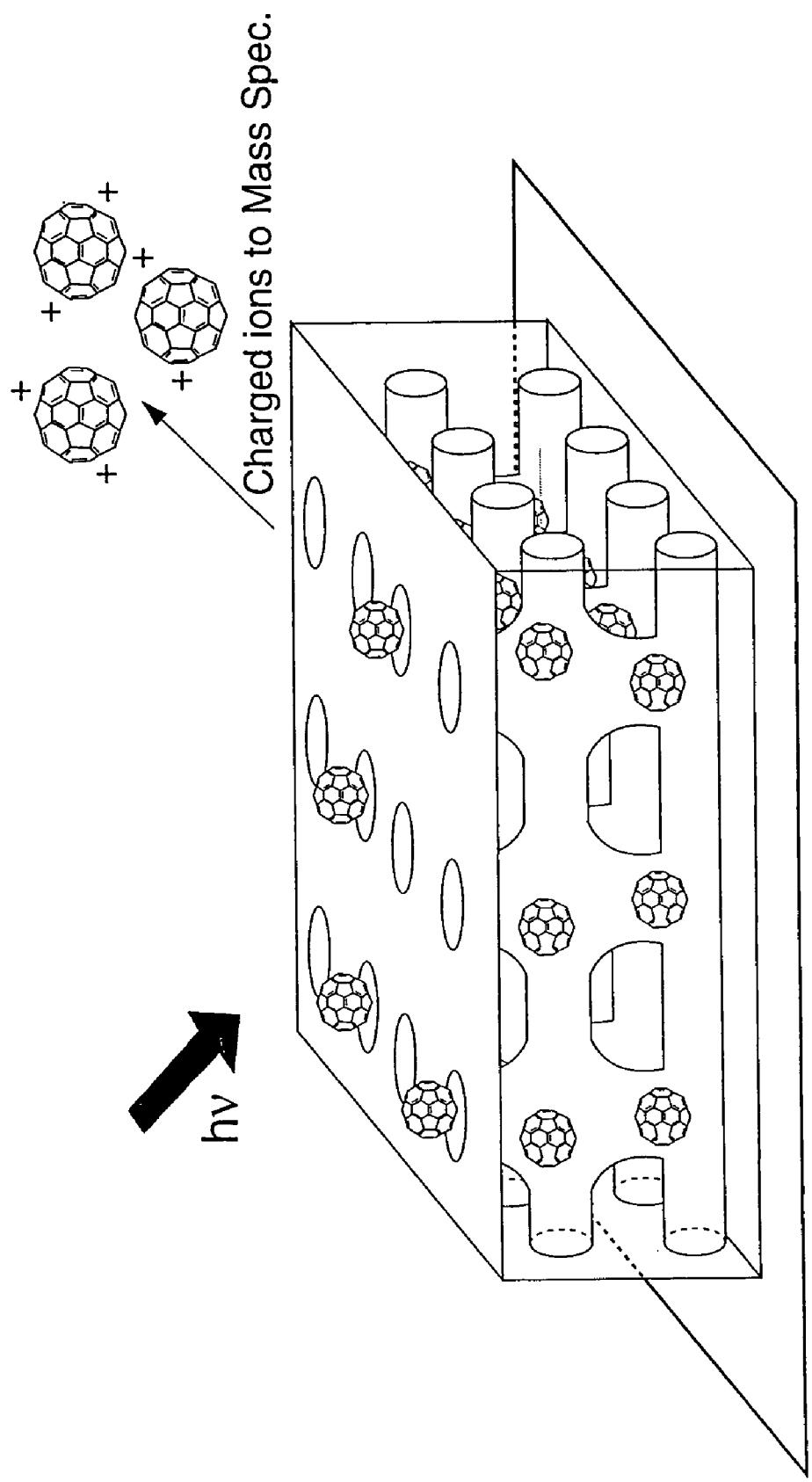
FIG. 1 shows a schematic representation of a mesoporous silica film being used for laser desorption/ionization mass spectrometry of $C_{60}$ according to the present invention.

The invention relates to the use of a mesoporous silica thin film or patterned nanocomposite/mesoporous silica thin film as a sample holder for matrix-free laser desorption/ionization mass spectrometry. Mesostructured silica has an ordered arrangement of columnar micelles of surfactant; the columnar micelles surrounded by silica are organized in the form of an array, such as a hexagonal array or cubic array. A hexagonal array, for example, is defined by an A-B-A packing arrangement of the surfactant columnar micelles; cubic arrays have an A-B-C packing arrangement of surfactant micelles. Once the surfactant is removed from the initially prepared nanocomposite silica film, the silica maintains its ordered arrangement such that the channels containing the surfactant micelles are empty, or filled partly or completely with water.

A thin film of mesoporous silica was formed as follows. First, a solution of tetraorthosilicate (TEOS, 61 milliliters, ALDRICH®), anhydrous ethanol ($C_2H_5OH$, 61 milliliters, FISHER®), deionized water (0,44 milliliters, greater than 18 MΩ), and hydrochloric acid (0.2 milliliters of 0.07 molar HCl) was prepared. The solution was refluxed at a temperature of about 60 degrees Celsius for about 90 minutes. After allowing the solution to cool to room temperature, a 10 ml aliquot of the solution was diluted with anhydrous ethanol (20 ml), hydrochloric acid (1 ml of 0.07 M HCl), and water (0.35 ml), and a surfactant. Various surfactants were used, including cetyl trimethylammonium bromide (CTAB), Brij56 ($C_{16}H_{33}(OCH_2CH_2)_nOH$, wherein n is about 10), and PLURONICS123 (BASF®, $HO(CH_2CH_2O)_{20}(CH_2CH$ $(CH_3)O)_{70}(CH_2CH_2O)_{20}OH)$ to yield final mole ratios of 1 TEOS: 22.2 $C_2H_5OH$:5.03$H_2O$:0.004 HCl:0.002–0.045 surfactant. The solution was then placed in a sonicating bath for at least 30 minutes to help dissolve the surfactant.

A substrate (glass, silicon, etc.) was cleaned by exposure to deep ultraviolet radiation (184–254 nanometers) or to an oxygen plasma. The now clean substrate was placed into the solution and then withdrawn at a rate of from about 2 centimeters per minute (cm/min) to about 20 cm/min to yield an ordered, self-assembled, nanocomposite silica thin film, coated on the substrate, with thickness ranging from 150 nm to 350 nm. An ordered nanocomposite silica thin film is a thin film consisting of silica surrounding an ordered array of surfactant micelles.

The ordered nanocomposite film may also be prepared by spin-coating the above solution onto a substrate.

The ordered nanocomposite silica thin film was transformed into a mesoporous film by removing the surfactant. This was accomplished by calcining the nanocomposite thin film at a temperature of 450 degrees Celsius for 6 hours, or by exposing the nanocomposite thin film to deep ultraviolet radiation for about 2 hours.

UV exposure through a physical mask to selectively expose the nanocomposite silica thin film to deep UV light results in a patterned film comprised of mesoporous material in a nanocomposite matrix.

Removal of the surfactant by the above methods does not result in collapse of the three-dimensional framework that was initially provided by the surfactant chosen to template the resulting mesoporous silica thin film; the largest surfactant molecules yield the largest pore sizes. Pore sizes of this invention range in diameter from about 1 nanometer (nm) to about 50 nm. Films prepared using the surfactants Brij56 and P123 had pore sizes of about 4 nm and 8 nm, respectively.

Mesoporous silica thin films prepared using the above procedure have a thickness in the range from about 70 nm to about 300 nm depending on the speed at which the substrate is withdrawn from the solution and the method chosen to remove the surfactant. Modification of the final molar ratio of TEOS to ethanol to HCl to surfactant of the solution can extend this range of film thickness to a range from about 10 nm to about 750 nm.

The practice of the invention can be further understood with the accompanying figures. FIG. 1 shows a schematic representation of mesoporous silica being used for laser desorption/ionization mass spectrometry according to the present invention. The mesoporous silica structure, as shown in FIG. 1, may be described as an ordered cubic array of interconnected pores. Neutral molecules of $C_{60}$ are adsorbed onto the mesoporous silica film; they appear on the outer surface and also inside the pores of the film. Incident light (hv) on the silica film interacts with the film and adsorbed $C_{60}$ molecules, resulting in ionization of $C_{60}$ and desorption of the ions, which travel through a mass spectrometer to a detector.

Figure 2:
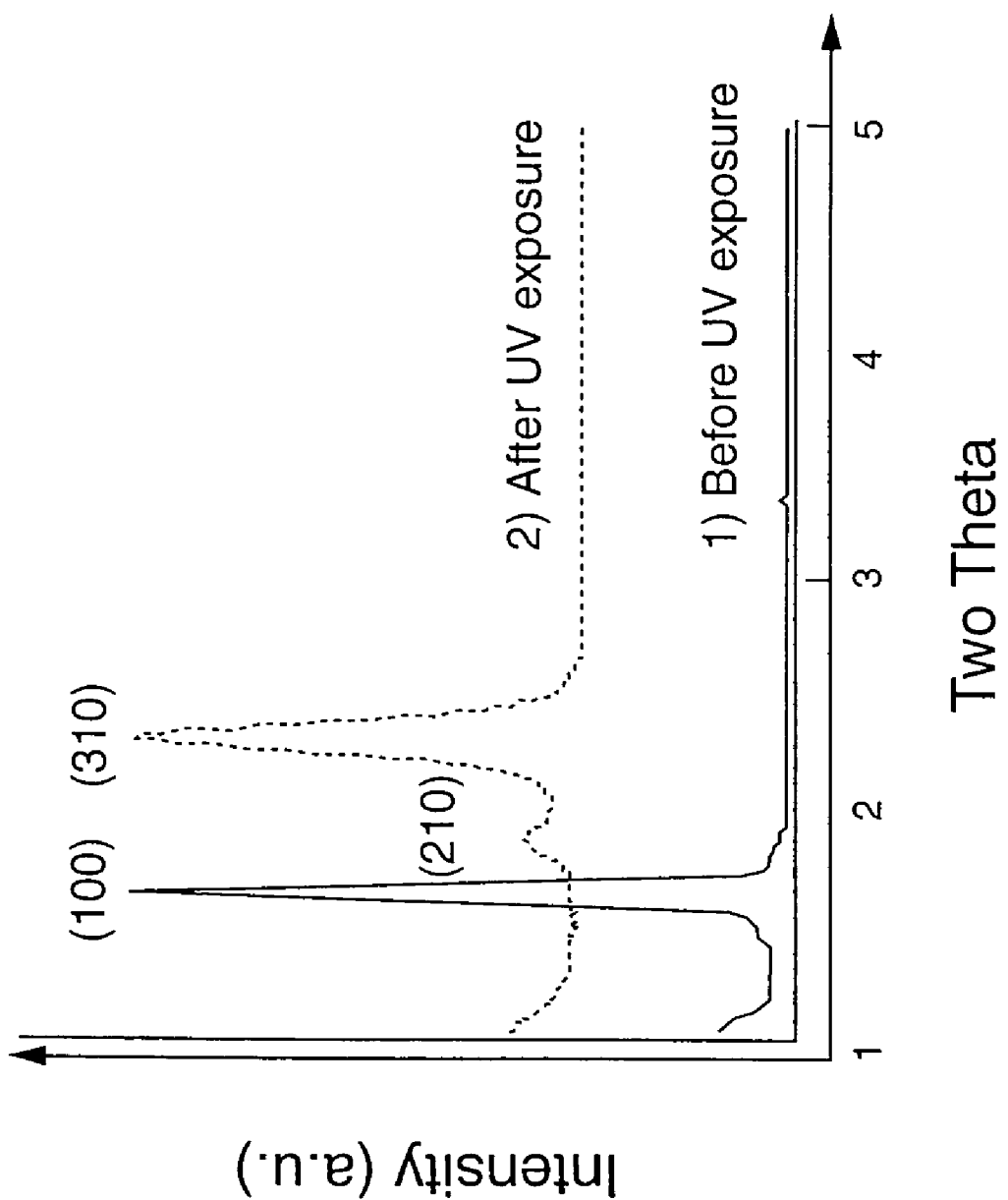
FIG. 2 shows two x-ray patterns, where the first is an x-ray pattern of an ordered nanocomposite silica thin film before deep UV exposure, and the second is the mesoporous film after deep-UV exposure.

The effect of deep ultraviolet (UV) radiation exposure on the structure of the silica thin films was examined by x-ray diffraction. FIG. 2 shows two x-ray diffraction patterns. They are labeled (1) and (2). The pattern labeled (1) is the x-ray diffraction pattern of an as-prepared ordered nanocomposite silica thin film. The second pattern, labeled (2) is the pattern for the same film after exposing it to deep UV radiation. The x-ray diffraction pattern of the as-prepared film, pattern (1) is consistent with a hexagonal phase. In contrast, the x-ray diffraction pattern of the film after deep-UV exposure is consistent with a cubic phase.

Figure 3:
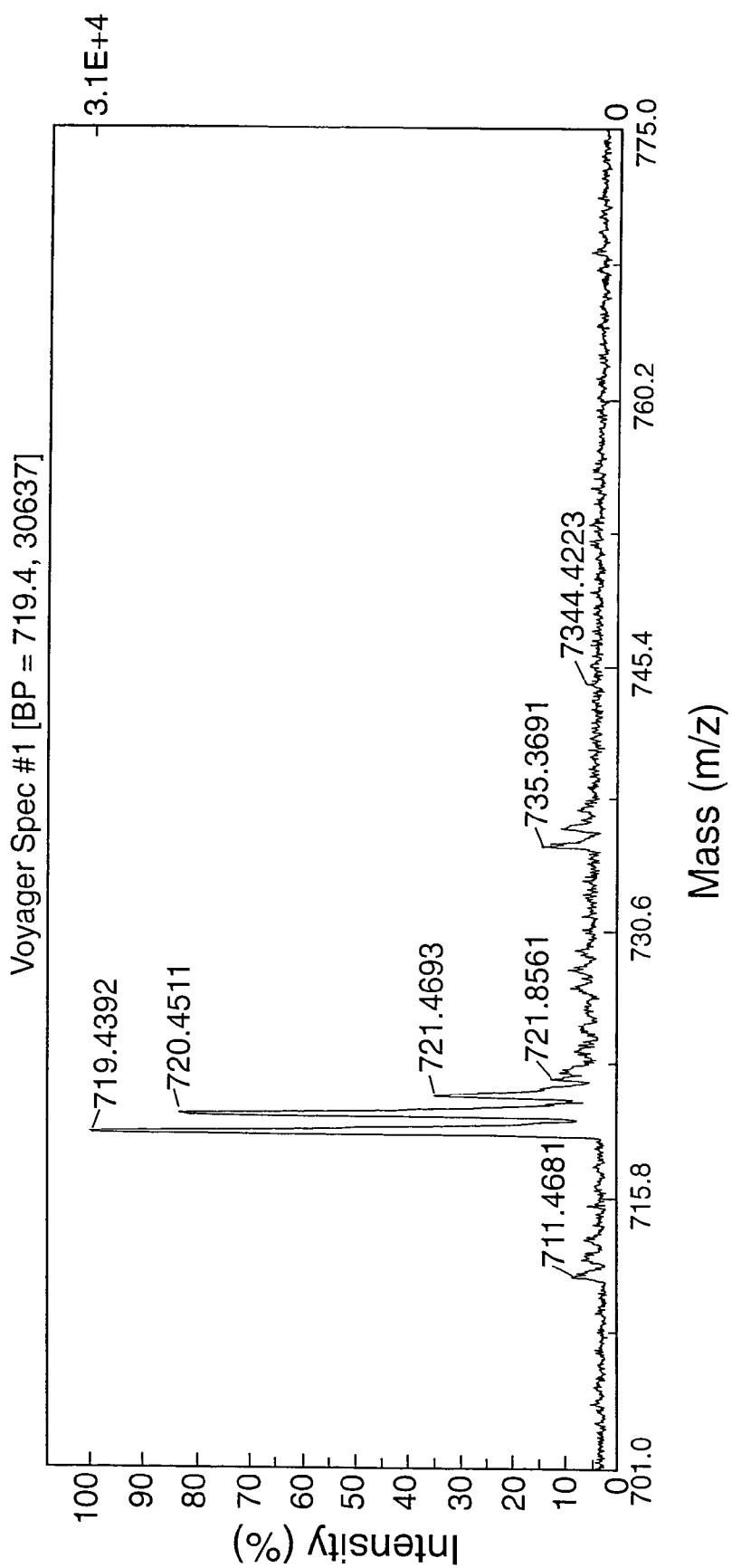
FIG. 3 shows a laser desorption/ionization mass spectrum of a sample of $C_{60}$ dissolved in toluene obtained using a mesoporous silica thin film according to the present invention.

Desorption/ionization from mesoporous silica thin films were tested using small molecules. FIG. 3 shows a laser desorption/ionization mass spectrum of a sample of $C_{60}$ (molecular weight about 720) dissolved in toluene and spotted on a mesoporous silica thin film. The spectral range shown is from about 705 mass units to about 775 mass units. The largest peaks appear clustered about a mass of about 720.

Figure 5:
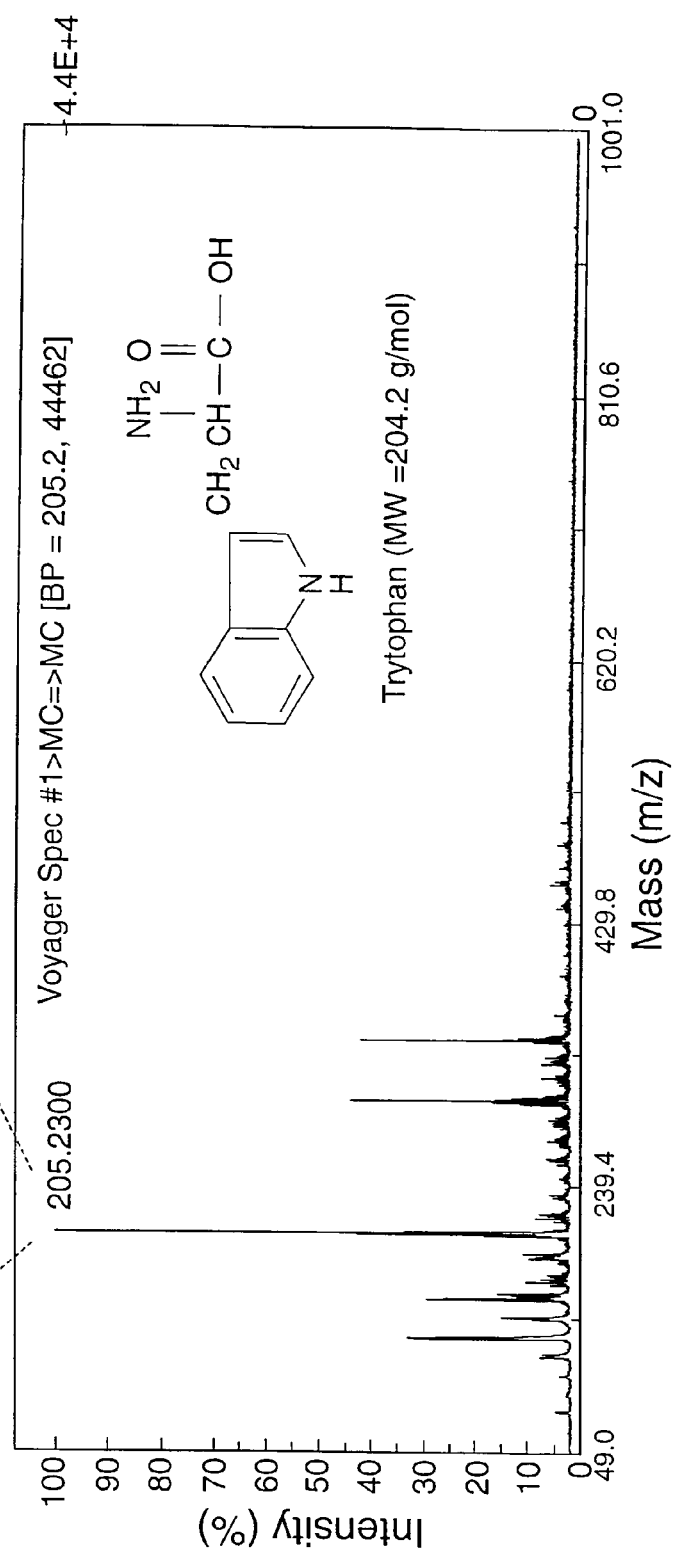
FIG. 5 shows a laser desorption/ionization mass spectrum of tryptophan obtained using a mesoporous silica thin film according to the present invention.

FIG. 5 shows a laser desorption/ionization mass spectrum of a sample of tryptophan dissolved in trifluoroacetic acid. The sample came straight from an older bottle of tryptophan, and without purification. A series of peaks appear from about 130 to about 346 mass units. The largest peak at about 205 mass units is assigned to the $[M+H]^+$ ion, and the peak at about 130 mass units is assigned to the trifluoroacetic acid ion. Other peaks are likely due to impurities, and perhaps adducts of tryptophan.

Figure 4:
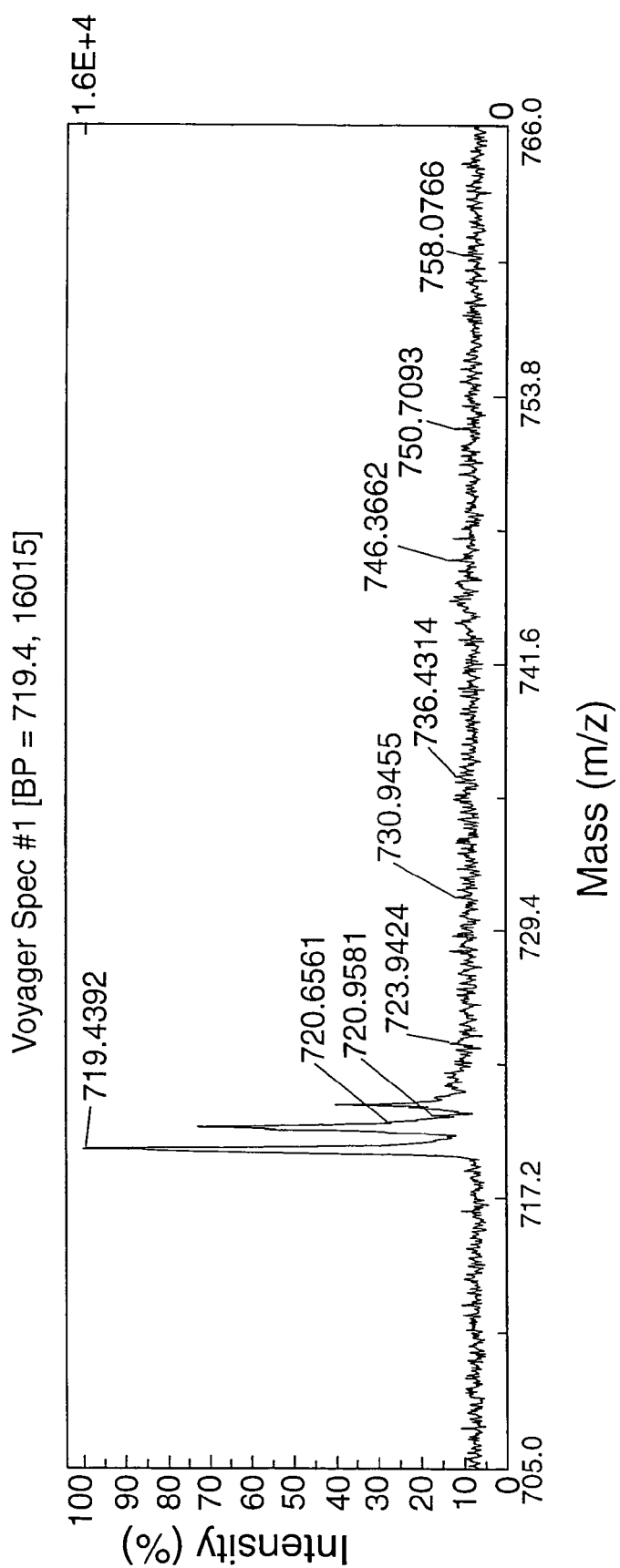
FIG. 4 shows a laser desorption/ionization mass spectrum of the $C_{60}$ sample after the mesoporous silica thin film was aged for was aged for 6 months in air.

Performance degradation appears to be minimal for mesoporous silica thin films used with the invention even after aging the films in air for several months. A mesoporous silica film like the one used for obtaining the spectrum shown in FIG. 3 was prepared and aged in air for six months. Its performance was tested by spotting another sample of $C_{60}$ in toluene onto the aged film and obtaining another spectrum, which is shown in FIG. 4. The spectra shown in FIG. 3 and FIG. 4 are nearly identical.

The following EXAMPLES illustrate the operability of the invention.

EXAMPLE 1

A thin film of mesoporous silica was formed as follows. First, a solution of tetraorthosilicate (TEOS, 61 milliliters, ALDRICH), anhydrous ethanol ($C_2H_5OH$, 61 milliliters, FISHER), deionized water (0.44 milliliters, greater than 18 MΩ), and hydrochloric acid (0.2 milliliters of 0.07 molar HCl) was prepared. The solution was heated to reflux at a temperature of about 60 degrees Celsius for about 90 minutes. After allowing the solution to cool to room temperature, a 10 ml aliquot of the solution was diluted with anhydrous ethanol (20 ml), hydrochloric acid (1 ml of 0.07 M HCl), and water (0.35 ml), and a surfactant. Brij56 ($C_{16}H_{33}(OCH_2CH_2)_nOH$, wherein n is about 10) was added to yield final mole ratios of 1 TEOS:22.2 $C_2H_5OH$:5.03$H_2O$: 0.004 HCl:0.002–0.045 surfactant. The solution was then placed in a sonicating bath and sonicated until the surfactant dissolved.

A silicon substrate was cleaned by exposure to deep ultraviolet radiation (184–254 nanometers). The substrate was placed into the solution and then withdrawn at a rate of 20 cm/min to yield an ordered, self-assembled, nanocomposite silica thin film coated on the substrate.

The resulting ordered nanocomposite silica thin film, having an ordered arrangement of micelles, was transformed into a patterned nanocomposite/mesoporous film by selectively removing the surfactant from desired regions of the nanocomposite film. This was accomplished by selectively exposing the nanocomposite thin film to deep ultraviolet radiation for about 2 hours through a physical mask to generate a patterned, mesoporous, nanocomposite thin film. Removal of the surfactant by this method does not result in collapse of the three-dimensional framework that was initially provided by the surfactant.

Mesoporous silica thins film prepared using this above procedure have a film thickness of approximately 200 nm and an approximate average pore size of about 4 nm.

The patterned, mesoporous silica thin film was tested within a month of preparation using $C_{60}$. A sample of $C_{60}$ dissolved in toluene (about 5 microliters of a 1 molar solution of $C_{60}$) was spotted on the patterned mesoporous nanocomposite silica thin film. After allowing the toluene to evaporate, the thin film with adsorbed sample was placed on a standard MALDI steel plate and inserted into an ion generating section of a mass spectrometer and exposed to a laser light beam. The light beam desorbed and ionized the sample, and the desorbed and ionized sample was detected. The resulting spectrum is shown in FIG. 3.

EXAMPLE 2

A patterned, mesoporous silica thin film having a film thickness of about 200 nm and a pore size of about 4 nm was prepared as described in EXAMPLE 1. After aging the film in the air for 6 months, a sample of $C_{60}$ dissolved in toluene (1 mM) was spotted on the film, which was put into an ion generating section of a mass spectrometer where it was exposed to a laser light beam to desorb and ionize the sample, and the desorbed and ionized sample is detected. The resulting spectrum is shown in FIG. 4

EXAMPLE 3

A patterned, mesoporous silica thin film having a film thickness of about 200 nm and a pore size of about 4 nm was prepared as described in EXAMPLE 1. After aging the thin film in the air for about 6 months, a sample of tryptophan dissolved in trifluoroacetic acid was adsorbed onto and into the patterned mesoporous silica thin film. The thin film with adsorbed sample was put into an ion generating section of a mass spectrometer where it was exposed to a laser light beam to desorb and ionize the sample, and the desorbed and ionized sample is detected. The resulting spectrum is shown in FIG. 5.

Thus, the invention was successfully demonstrated using mesoporous silica thin films prepared using Brij56 surfactant templates. In contrast to commercially available porous silicon chips that lose their ability to desorb after about a month, mesoporous silica films used with the present invention retain their desorbing capability as evidenced by desorption/ionization of $C_{60}$ and tryptophan from mesoporous silica stored for 6 months under typical laboratory conditions in air at room temperature.

The foregoing description of the invention has been presented for purposes of illustration and description and is not intended to be exhaustive or to limit the invention to the precise form disclosed, and obviously many modifications and variations are possible in light of the above teaching. Other surfactants than the ones described herein, for example, could be used to prepare mesoporous silica thin films according to the present invention that could be used for desorption/ionization mass spectrometry. These surfactants include cationic, anionic, and electrically neutral surfactants. The mesoporous silica thin film may include a range of pore sizes from about 1 nm to about 50 nm. Films with larger pore sizes could be prepared using larger surfactant molecules. Surfactant removal could be performed not only by exposure to ultraviolet radiation, but also by any other method capable of removing the surfactant but maintaining the 3-dimensional structure such as by calcination or solvent extraction. Coating a substrate to form the ordered nanocomposite film prior to surfactant removal could be performed using any coating method, such as dip coating or spin coating to name a few, may be employed. Surfactant removal can provide a mesoporous thin film with a thickness from about 1 nanometer to 1000 microns, preferably from about 100 nanometers to about 1 micron, and most preferably from 100 nanometers to about 500 nanometers.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for performing laser desorption mass spectrometry comprising:
    forming an ordered nanocomposite thin film on a substrate, the thin film comprising a surfactant;
    removing the surfactant to transform the film into mesoporous silica thin film;
    adsorbing a sample on the mesoporous silica thin film;
    exposing the mesoporous silica thin film with adsorbed sample to a laser light beam in an ion-generating section of a mass spectrometer to desorb and ionize the sample; and
    detecting the desorbed and ionized sample.

2. The method of claim 1, wherein forming the ordered nanocomposite thin film comprises dip-coating.

3. The method of claim 1, wherein forming the ordered nanocomposite thin film comprises spin-coating.

4. The method of claim 1, wherein the surfactant comprises a cationic surfactant.

5. The method of claim 1, wherein the surfactant comprises an anionic surfactant.

6. The method of claim 1, wherein the surfactant comprises an electrically neutral surfactant.

7. The method of claim 1, wherein the mesoporous silica thin film comprises a thickness of from about 1 nanometer to about 1 micron.

8. The method of claim 1, wherein the surfactant is removed from the ordered nanocomposite thin film by exposing the ordered nanocomposite thin film to ultraviolet radiation.

9. The method of claim 1, wherein the surfactant is removed from the ordered nanocomposite thin film by passing ultraviolet light through a physical mask onto the nanocomposite thin film and the mesoporous silica thin film formed comprises a pattern on the thin film.

10. The method of claim 1, wherein the surfactant is removed from the ordered nanocomposite thin film by thermal calcination.

11. The method of claim 1, wherein the surfactant is removed from the ordered nanocomposite thin film by extracting the surfactant into a solvent.

12. The method of claim 1, wherein the ordered nanocomposite thin film is formed from an ethanolic silicate solution.

13. A method for performing laser desorption mass spectrometry comprising:
    preparing a self-assembled, ordered, nanocomposite, silica thin film on a substrate; the self-assembled, ordered, nanocomposite silica thin film comprising a surfactant chosen to produce an ordered mesoporous silica thin film having a desired pore size;
    removing the surfactant to form the ordered mesoporous silica thin film;
    adsorbing a sample on the mesoporous silica thin film;

exposing the mesoporous silica thin film to a laser light beam in an ion generating section of a mass spectrometer to desorb and ionize the sample; and detecting the desorbed and ionized sample.

14. The method of claim 13, wherein preparing the self-assembled, ordered, nanocomposite, silica thin film comprises dip coating a solution on the substrate.

15. The method of claim 13, wherein preparing the self-assembled ordered, nanocomposite, silica thin film comprises spin coating a solution on the substrate.

16. The method of claim 13, wherein the surfactant comprises a cationic surfactant.

17. The method of claim 13, wherein the surfactant comprises an anionic surfactant.

18. The method of claim 13, wherein the surfactant comprises an electrically neutral surfactant.

19. The method of claim 13, wherein the mesoporous silica thin film comprises a thickness of from about 1 nanometer to about 1 micron.

20. The method of claim 13, wherein the surfactant is removed from the ordered nanocomposite thin film by exposing the ordered nanocomposite thin film to ultraviolet radiation.

21. The method of claim 13, wherein the surfactant is removed from the ordered nanocomposite thin film by passing ultraviolet light through a physical mask onto the nanocomposite thin film and the resulting mesoporous silica thin film comprises a pattern on the film.

22. The method of claim 13, wherein the surfactant is removed from the ordered nanocomposite thin film by thermal calcination.

23. The method of claim 13, wherein the surfactant is removed from the ordered nanocomposite thin film by extracting the surfactant into a solvent.

24. The method of claim 13, wherein the ordered nanocomposite thin film is formed from an ethanolic silicate solution.

25. A method for performing laser desorption mass spectrometry comprising:

adsorbing a sample on mesoporous silica comprising a pore size of from about 1 nanometer to about 50 nanometers wherein the mesoporous silica is prepared by forming an ordered nanocomposite thin film on a substrate, the thin film comprising a surfactant; and removing the surfactant to transform the film into mesoporous silica thin film;

exposing the mesoporous silica to a laser light beam in an ion-generating section of a mass spectrometer to desorb and ionize the sample; and detecting the desorbed and ionized sample.

* * * * *